US010839276B2

(12) United States Patent
Nemet

(10) Patent No.: US 10,839,276 B2
(45) Date of Patent: *Nov. 17, 2020

(54) TAMPER-PROOF QUALITY MANAGEMENT BARCODE INDICATORS

(71) Applicant: VARCODE LTD., Rosh Ha'ayin (IL)

(72) Inventor: Yaron Nemet, Kedumim (IL)

(73) Assignee: Varcode Ltd., Rosh Ha'ayin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,484

(22) Filed: Oct. 29, 2019

(65) Prior Publication Data

US 2020/0134409 A1 Apr. 30, 2020

Related U.S. Application Data

(63) Continuation of application No. 16/293,117, filed on Mar. 5, 2019, now Pat. No. 10,552,719, which is a
(Continued)

(51) Int. Cl.
*G06K 19/06* (2006.01)
*G01D 7/00* (2006.01)

(52) U.S. Cl.
CPC ......... *G06K 19/0615* (2013.01); *G01D 7/005* (2013.01); *G06K 19/06028* (2013.01); *G06K 19/06046* (2013.01)

(58) Field of Classification Search
None
See application file for complete search history.

(56) References Cited

U.S. PATENT DOCUMENTS 4,057,029 A 11/1977 Seiter
4,059,407 A 11/1977 Hochstrasser
(Continued)

FOREIGN PATENT DOCUMENTS

CN 1720180 1/2006
CN 1914621 2/2007
(Continued)

OTHER PUBLICATIONS

An International Preliminary Report on Patentability dated Nov. 22, 2011 which issued during the prosecution of Applicant's PCT/IL10/00205.
U.S. Appl. No. 61/231,799, filed Aug. 6, 2009.
An International Search Report and a Written Opinion both dated Jul. 17, 2008, which issued during the prosecution of Applicant's PCT/IL2007000547.
An International Preliminary Report on Patentability dated Mar. 10, 2009, which issued during the prosecution of Applicant's PCTIL2007000547.
(Continued)

*Primary Examiner* — Christle I Marshall
(74) *Attorney, Agent, or Firm* — Fish & Richardson P.C.

(57) ABSTRACT

A tamper-proof barcoded quality indicator operative to provide a machine-readable indication of exceedance of time and temperature thresholds following actuation thereof, including a first barcode including a first colorable area and being machine-readable before exceedance of the time and temperature thresholds, a second barcode including a second colorable area and not being machine-readable before exceedance of the time and temperature thresholds, a coloring agent located at a first location on the indicator, a coloring agent pathway operative to allow the coloring agent to move, at a rate which is at least partially a function of time, from the first location to the first and second colorable areas simultaneously for simultaneous coloring thereof upon exceedance of the time and temperature thresholds, thereby causing the first barcode to become unreadable and at the same time causing the second barcode to become machine-readable, and a tamper-proof actuator element operative to actuate the indicator.

5 Claims, 4 Drawing Sheets

Related U.S. Application Data continuation of application No. 15/944,122, filed on Apr. 3, 2018, now Pat. No. 10,242,302, which is a continuation of application No. 15/495,022, filed on Apr. 24, 2017, now Pat. No. 9,965,712, which is a continuation of application No. 15/189,127, filed on Jun. 22, 2016, now Pat. No. 9,633,296, which is a continuation of application No. 14/823,758, filed on Aug. 11, 2015, now Pat. No. 9,400,952, which is a continuation of application No. 14/461,778, filed on Aug. 18, 2014, now Pat. No. 9,122,963, which is a continuation of application No. 13/657,185, filed on Oct. 22, 2012, now Pat. No. 8,807,422.

(56) References Cited

U.S. PATENT DOCUMENTS

| | | |
|---|---|---|
| RE31,586 E | 5/1984 | Magnussen |
| 4,674,065 A | 6/1987 | Lange et al. |
| 5,053,339 A | 10/1991 | Patel |
| 5,084,143 A | 1/1992 | Smith |
| 5,085,802 A | 2/1992 | Jalinski |
| 5,146,405 A | 9/1992 | Church et al. |
| 5,202,677 A | 4/1993 | Parker et al. |
| 5,254,473 A | 10/1993 | Patel |
| 5,369,577 A | 11/1994 | Kadashevich et al. |
| 5,451,932 A | 9/1995 | Wunderlich et al. |
| 5,485,372 A | 1/1996 | Golding et al. |
| 5,499,597 A | 3/1996 | Kronberg |
| 5,591,952 A | 1/1997 | Krichever |
| 5,600,119 A | 2/1997 | Dvorkis |
| 5,617,488 A | 4/1997 | Hong et al. |
| 5,634,195 A | 5/1997 | Sawyer |
| 5,659,771 A | 8/1997 | Golding |
| 5,752,227 A | 5/1998 | Lyberg |
| 5,805,245 A | 9/1998 | Davis |
| 5,822,728 A | 10/1998 | Applebaum et al. |
| 5,828,991 A | 10/1998 | Skiena et al. |
| 5,841,285 A | 11/1998 | Bailey |
| 5,882,116 A | 3/1999 | Backus |
| 5,895,075 A | 4/1999 | Edwards |
| 5,899,973 A | 5/1999 | Bandara et al. |
| 5,902,982 A | 5/1999 | Lappe |
| 5,907,839 A | 5/1999 | Roth |
| 5,936,508 A | 8/1999 | Parker |
| 5,956,739 A | 9/1999 | Golding et al. |
| 6,006,221 A | 12/1999 | Liddy et al. |
| 6,009,400 A | 12/1999 | Blackman |
| 6,036,092 A | 3/2000 | Lappe |
| 6,085,206 A | 7/2000 | Domini et al. |
| 6,098,034 A | 8/2000 | Razin et al. |
| 6,154,722 A | 11/2000 | Bellegarda |
| 6,171,261 B1 | 1/2001 | Arai et al. |
| 6,190,610 B1 | 2/2001 | Goldsmith et al. |
| 6,214,623 B1 | 4/2001 | Simons et al. |
| 6,272,242 B1 | 8/2001 | Saitoh et al. |
| 6,314,400 B1 | 11/2001 | Klakow |
| 6,335,922 B1 | 1/2002 | Tiedemann et al. |
| 6,366,759 B1 | 4/2002 | Burstein et al. |
| 6,424,983 B1 | 7/2002 | Schabes et al. |
| 6,456,972 B1 | 9/2002 | Gladstein et al. |
| 6,479,016 B1 | 11/2002 | Goldsmith |
| 6,495,368 B1 | 12/2002 | Wallach |
| 6,544,925 B1 | 4/2003 | Prusik et al. |
| 6,685,094 B2 | 2/2004 | Cameron |
| 6,751,584 B2 | 6/2004 | Bangalore |
| 6,758,397 B2 | 7/2004 | Catan |
| 6,920,420 B2 | 7/2005 | Lin |
| 6,982,640 B2 | 1/2006 | Lindsay |
| 7,017,806 B2 | 3/2006 | Peterson |
| 7,020,338 B1 | 3/2006 | Cumbee |
| 7,030,863 B2 | 4/2006 | Longe et al. |
| 7,053,777 B2 | 5/2006 | Allen |
| 7,054,293 B2 | 5/2006 | Tiedemann et al. |
| 7,057,495 B2 | 6/2006 | Debord |
| RE39,226 E | 8/2006 | Lappe |
| 7,092,567 B2 | 8/2006 | Ma et al. |
| RE39,266 E | 9/2006 | Lohray et al. |
| 7,117,144 B2 | 10/2006 | Goodman et al. |
| 7,156,597 B2 | 1/2007 | Goldsmith et al. |
| 7,157,048 B2 | 1/2007 | Goldsmith et al. |
| 7,165,019 B1 | 1/2007 | Lee et al. |
| 7,166,345 B2 | 1/2007 | Myers |
| 7,184,950 B2 | 2/2007 | Weise |
| 7,224,346 B2 | 5/2007 | Sheng |
| 7,262,792 B2 | 8/2007 | Shniberg |
| 7,277,088 B2 | 10/2007 | Robinson et al. |
| 7,295,965 B2 | 11/2007 | Haigh et al. |
| 7,295,968 B2 | 11/2007 | Bietrix et al. |
| 7,296,019 B1 | 11/2007 | Chandrasekar et al. |
| 7,340,388 B2 | 3/2008 | Soricut |
| 7,386,442 B2 | 6/2008 | Dehlinger et al. |
| 7,457,808 B2 | 11/2008 | Gaussier |
| 7,475,015 B2 | 1/2009 | Epstein et al. |
| 7,558,725 B2 | 7/2009 | Greenwald et al. |
| 7,562,811 B2 | 7/2009 | Nemet et al. |
| 7,584,093 B2 | 9/2009 | Potter et al. |
| 7,587,217 B1 | 9/2009 | Laakso et al. |
| 7,590,626 B2 | 9/2009 | Li et al. |
| 7,702,680 B2 | 4/2010 | Yih et al. |
| 7,747,427 B2 | 6/2010 | Lee et al. |
| 7,813,916 B2 | 10/2010 | Bean |
| 7,917,355 B2 | 3/2011 | Wu et al. |
| 8,005,664 B2 | 8/2011 | Hanumanthappa |
| 8,091,776 B2 | 1/2012 | Nemet |
| 8,196,821 B2 | 6/2012 | Nemet |
| 8,271,266 B2 | 9/2012 | Gallagher et al. |
| 8,321,786 B2 | 11/2012 | Lunati |
| 8,341,520 B2 | 12/2012 | Iakobashvili et al. |
| 8,365,070 B2 | 1/2013 | Song et al. |
| 8,473,278 B2 | 6/2013 | Futagi et al. |
| 8,500,014 B2 | 8/2013 | Nemet et al. |
| 8,528,808 B2 | 9/2013 | Nemet |
| 8,540,156 B2 | 9/2013 | Nemet |
| 8,579,193 B2 | 11/2013 | Nemet |
| 8,626,786 B2 | 1/2014 | Halcrow et al. |
| 8,807,422 B2 | 8/2014 | Nemet |
| 8,950,664 B2 | 2/2015 | Nemet et al. |
| 8,960,534 B2 | 2/2015 | Nemet et al. |
| 8,967,467 B2 | 3/2015 | Nemet et al. |
| 9,122,963 B2 | 9/2015 | Nemet |
| 9,135,544 B2 | 9/2015 | Nemet et al. |
| 9,317,794 B2 | 4/2016 | Nemet et al. |
| 9,349,086 B2 | 5/2016 | Nemet et al. |
| 9,373,100 B2 | 6/2016 | Nemet et al. |
| 9,384,435 B2 | 7/2016 | Nemet et al. |
| 9,396,423 B2 | 7/2016 | Nemet et al. |
| 9,400,952 B2 | 7/2016 | Nemet |
| 9,613,296 B1 | 4/2017 | Nemet |
| 9,626,610 B2 | 4/2017 | Nemet et al. |
| 9,633,296 B2 | 4/2017 | Nemet |
| 9,965,712 B2 | 5/2018 | Nemet |
| 10,242,302 B2 | 3/2019 | Nemet |
| 10,303,992 B2 | 5/2019 | Nemet |
| 10,552,719 B2 * | 2/2020 | Nemet ............ G06K 19/06046 |
| 2002/0012332 A1 | 1/2002 | Tiedemann et al. |
| 2002/0032564 A1 | 3/2002 | Eshani et al. |
| 2002/0056756 A1 | 5/2002 | Cameron et al. |
| 2002/0178821 A1 | 9/2002 | Ehsani |
| 2002/0169595 A1 | 11/2002 | Agichtein et al. |
| 2003/0187632 A1 | 10/2003 | Menich |
| 2003/0204569 A1 | 10/2003 | Andrews et al. |
| 2003/0210249 A1 | 11/2003 | Simske |
| 2003/0227392 A1 | 12/2003 | Ebert |
| 2003/0233222 A1 | 12/2003 | Soricut et al. |
| 2004/0002849 A1 | 1/2004 | Zhou |
| 2004/0018641 A1 | 1/2004 | Goldsmith et al. |
| 2004/0030540 A1 | 2/2004 | Ovil et al. |
| 2004/0093567 A1 | 5/2004 | Schabes et al. |
| 2004/0138869 A1 | 7/2004 | Heinecke |
| 2004/0215514 A1 | 10/2004 | Devlin |
| 2004/0260543 A1 | 12/2004 | Horowitz |
| 2005/0043940 A1 | 2/2005 | Elder |
| 2005/0044495 A1 | 2/2005 | Lee et al. |

(56) References Cited

U.S. PATENT DOCUMENTS

| | | |
|---|---|---|
| 2005/0053900 A1 | 3/2005 | Kaufmann |
| 2005/0091030 A1 | 4/2005 | Jessee et al. |
| 2005/0091088 A1 | 4/2005 | Peterson |
| 2005/0108001 A1 | 5/2005 | Aarskog |
| 2005/0120002 A1 | 6/2005 | Behbehani |
| 2005/0139686 A1 | 6/2005 | Helmer et al. |
| 2005/0143971 A1 | 6/2005 | Burstein |
| 2005/0162274 A1 | 7/2005 | Shniberg et al. |
| 2005/0209844 A1 | 9/2005 | Wu et al. |
| 2005/0257146 A1 | 11/2005 | Ashcraft et al. |
| 2006/0003297 A1 | 1/2006 | Wiig et al. |
| 2006/0032427 A1 | 2/2006 | Ishii et al. |
| 2006/0048055 A1 | 3/2006 | Wu et al. |
| 2006/0057022 A1 | 3/2006 | Williams |
| 2006/0074655 A1 | 4/2006 | Bejar et al. |
| 2006/0081711 A1 | 4/2006 | Zhao et al. |
| 2006/0110714 A1 | 5/2006 | Symmes |
| 2006/0129381 A1 | 6/2006 | Wakita |
| 2006/0247914 A1 | 11/2006 | Brener et al. |
| 2006/0260958 A1 | 11/2006 | Brunner |
| 2007/0067177 A1 | 3/2007 | Martin |
| 2007/0094024 A1 | 4/2007 | Kristensson et al. |
| 2007/0106937 A1 | 5/2007 | Cucerzan et al. |
| 2007/0141544 A1 | 6/2007 | Nakane |
| 2007/0238084 A1 | 10/2007 | Maguire et al. |
| 2007/0265831 A1 | 11/2007 | Dinur et al. |
| 2007/0271089 A1 | 11/2007 | Bates et al. |
| 2008/0059151 A1 | 3/2008 | Chen |
| 2008/0077859 A1 | 3/2008 | Schabes et al. |
| 2008/0154600 A1 | 6/2008 | Tian et al. |
| 2008/0167858 A1 | 7/2008 | Christie et al. |
| 2008/0173712 A1 | 7/2008 | Nemet |
| 2008/0189106 A1 | 8/2008 | Low et al. |
| 2008/0195940 A1 | 8/2008 | Gail et al. |
| 2008/0208567 A1 | 8/2008 | Brockett et al. |
| 2008/0208582 A1 | 8/2008 | Gallino |
| 2008/0249773 A1 | 10/2008 | Bejar et al. |
| 2008/0270897 A1 | 10/2008 | Jawerth et al. |
| 2009/0083028 A1 | 3/2009 | Davtchev et al. |
| 2009/0198671 A1 | 8/2009 | Zhang |
| 2009/0228467 A1 | 9/2009 | Asanuma |
| 2009/0230182 A1 | 9/2009 | Nemet et al. |
| 2009/0302102 A1 | 12/2009 | Nemet et al. |
| 2009/0319257 A1 | 12/2009 | Blume et al. |
| 2009/0320742 A1 | 12/2009 | Leute et al. |
| 2010/0020970 A1 | 1/2010 | Liu |
| 2010/0050074 A1 | 2/2010 | Nachmani et al. |
| 2010/0219235 A1 | 9/2010 | Nemet et al. |
| 2010/0269454 A1 | 10/2010 | Reddersen et al. |
| 2010/0275118 A1 | 10/2010 | Iakobashvili et al. |
| 2010/0286979 A1 | 11/2010 | Zangvil et al. |
| 2011/0006109 A1 | 1/2011 | Nemet |
| 2011/0006115 A1 | 1/2011 | Nemet |
| 2011/0093268 A1 | 4/2011 | Gorin et al. |
| 2011/0184720 A1 | 7/2011 | Zangvil |
| 2012/0104105 A1 | 5/2012 | Nemet |
| 2012/0104106 A1 | 5/2012 | Nemet |
| 2012/0145781 A1 | 6/2012 | Nemet |
| 2012/0305637 A1 | 12/2012 | Nemet |
| 2013/0024185 A1 | 1/2013 | Parikh |
| 2013/0074248 A1 | 3/2013 | Evans et al. |
| 2013/0138641 A1 | 5/2013 | Korolev et al. |
| 2013/0334301 A1 | 12/2013 | Nemet et al. |
| 2014/0001256 A1 | 1/2014 | Nemet et al. |
| 2014/0110486 A1 | 4/2014 | Nemet |
| 2014/0252096 A1 | 9/2014 | Nemet et al. |
| 2014/0353385 A1 | 12/2014 | Nemet |
| 2014/0360269 A1 | 12/2014 | Burghardt et al. |
| 2015/0047552 A1 | 2/2015 | Ortais |
| 2015/0053776 A1 | 2/2015 | Nemet et al. |
| 2015/0100105 A1 | 4/2015 | Kiani et al. |
| 2015/0122880 A1 | 5/2015 | Nemet et al. |
| 2015/0168223 A1 | 6/2015 | Hammond et al. |
| 2015/0193677 A1 | 7/2015 | Nemet et al. |
| 2015/0220877 A1 | 8/2015 | Nemet et al. |
| 2016/0042260 A1 | 2/2016 | Nemet |
| 2016/0071000 A1 | 3/2016 | Nemet et al. |
| 2016/0239781 A1 | 8/2016 | Nemet et al. |
| 2016/0275390 A1 | 9/2016 | Nemet et al. |
| 2016/0292554 A1 | 10/2016 | Nemet et al. |
| 2016/0371577 A1 | 12/2016 | Nemet |
| 2017/0270396 A1 | 4/2017 | Nemet |

FOREIGN PATENT DOCUMENTS

| | | |
|---|---|---|
| CN | 101365934 | 2/2009 |
| CN | 204176727 | 2/2015 |
| EP | 936753 | 8/1999 |
| JP | S57-59293 | 4/1982 |
| JP | 63094383 | 4/1988 |
| JP | 63-118894 | 5/1988 |
| JP | 3-53281 | 3/1991 |
| JP | 5-6470 | 1/1993 |
| JP | 5-19695 | 1/1993 |
| JP | 5-67253 | 3/1993 |
| JP | 9-504858 | 11/1994 |
| JP | 2006-522933 | 5/1997 |
| JP | 2001-502794 | 2/2001 |
| JP | 2002-040012 | 2/2002 |
| JP | 2002/504684 | 2/2002 |
| JP | 2003-203210 | 7/2003 |
| JP | 2003/525464 | 8/2003 |
| JP | 2006-18782 | 1/2006 |
| JP | 2005-518320 | 5/2006 |
| JP | 2007121017 | 5/2007 |
| JP | 2004-184920 | 7/2007 |
| JP | 2008/089673 | 4/2008 |
| WO | WO 1994/27144 | 11/1994 |
| WO | WO 1994/27155 | 11/1994 |
| WO | WO 1997/011535 | 3/1997 |
| WO | WO 1998/14777 | 4/1998 |
| WO | WO 1998/035514 | 12/1998 |
| WO | WO 1999/042822 | 8/1999 |
| WO | WO 2001/048680 | 7/2001 |
| WO | WO 2001/064430 | 9/2001 |
| WO | WO 2003/060626 | 7/2003 |
| WO | WO 2004/038353 | 5/2004 |
| WO | WO 2004/038535 | 5/2004 |
| WO | WO 2004/092697 | 10/2004 |
| WO | WO 2006-086053 | 8/2006 |
| WO | WO 2007-049792 | 5/2007 |
| WO | WO 2008/022140 | 2/2008 |
| WO | WO 09/016631 | 2/2009 |
| WO | WO 2007/129316 | 4/2009 |
| WO | WO 2008/135962 | 4/2009 |
| WO | WO 2009/063464 | 5/2009 |
| WO | WO 2009/063465 | 5/2009 |
| WO | WO 2009-144701 | 12/2009 |
| WO | WO 2009/150641 | 12/2009 |
| WO | WO 10/013228 | 2/2010 |
| WO | WO 2010/134061 | 11/2010 |
| WO | WO 2010/134062 | 11/2010 |
| WO | WO 2006/134795 | 12/2016 |

OTHER PUBLICATIONS

An International Search Report and a Written Opinion both dated Jan. 9, 2009, which issued during the prosecution of Applicant's PCT/IL2007/001411.

An International Preliminary Report on Patentability dated Nov. 10, 2009, which issued during the prosecution of Applicant's PCT/IL2007/001411.

An International Search Report and a Written Opinion both dated Aug. 31, 2009, which issued during the prosecution of Applicant's PCT/IL2009/000503.

An International Preliminary Report on Patentability dated Dec. 13, 2010, which issued during the prosecution of Applicant's PCT/IL/2009/000503.

An International Search Report and a Written Opinion both dated Apr. 5, 2010, which issued during the prosecution of Applicant's PCT/IL2009/001167.

(56) References Cited

OTHER PUBLICATIONS

An International Preliminary Report on Patentability dated Nov. 22, 2011, which issued during the prosecution of Applicant's PCT/IL2009/001167.
An International Preliminary Report on Patentability dated Jan. 9, 2018, which issued during the prosecution of Applicant's PCT/IL2016/050727.
An International Search Report and a Written Opinion both dated Oct. 3, 2016, which issued during the prosecution of Applicant's PCT/IL2016/050526.
An International Search Report and a Written Opinion both dated May 25, 2011, which issued during the prosecution of Applicant's PCT/IL2011/00088.
Bick, E., "A Constraint Grammar Based Spellchecker for Danish with a Special Focus on Dyslexics" SKY Journal of Linguistics, vol. 19:2006 (ISSN 1796-279X), pp. 387-396 (retrieved Jan. 12, 2009 from the internet). <URL http://www.ling.helsinki.fi/sky/julkaisut/SKY2006_1/.6.1.%BICK.pdf>.
An International Search Report and Written Opinion both dated Feb. 3, 2009 which issued during the prosecution of Applicant's PCT/IL08/01051.
An International Search Report and a Written Opinion both dated Jun. 3, 2009, which issued during the prosecution of Applicant's PCT/IL2008/001494.
An International Search Report and a Written Opinion both dated Jun. 8, 2010, which issued during the prosecution of Applicant's PCT/IL2010/000205.
An International Search Report and a Written Opinion both dated Mar. 9, 2009, which issued during the prosecution of Applicant's PCT/IL2008/001495.
U.S. Appl. No. 60/963,956, filed Aug. 6, 2007.
An International Search Report and a Written Opinion both dated Dec. 12, 2016, which issued during the prosecution of Applicant's PCT/IL2016/050727.
An English translation of an Office Action dated Feb. 3, 2014 which issued during the prosecution of Japanese Patent Application No. 2012-511407.
An English Translation of an Office Action dated Feb. 18, 2014 which issued during the prosecution of Japanese Patent Application No. JP2009-508663.
An English Translation of an Office Action dated Feb. 26, 2013 which issued during the prosecution of Japanese Patent Application No. JP2009-508663.
An English Translation of an Office Action dated Nov. 15, 2014 which issued during the prosecution of Chinese Patent Application No. 200980160387.4.
An English Translation of an Office Action dated Dec. 24, 2013 which issued during the prosecution of Chinese Patent Application No. 200980160387.4.
An English Translation of an Office Action dated Dec. 31, 2015 which issued during the prosecution of Israeli Patent Application No. 209901.
An Office Action dated Jun. 20, 2008, which issued during the prosecution of U.S. Appl. No. 11/852,911.
An Examiner Interview Summary Report dated Nov. 7, 2008, which issued during the prosecution of U.S. Appl. No. 11/852,911.
A Notice of Allowance dated Feb. 25, 2009, which issued during the prosecution of U.S. Appl. No. 11/852,911.
A Notice of Allowance dated Apr. 17, 2009, which issued during the prosecution of U.S. Appl. No. 11/852,911.
An International Search Report dated May 11, 2009, which issued during the prosecution of Applicant's PCT/IL2009/00130.
An International Search Report dated Jun. 26, 2009. which issued during the prosecution of Applicant's PCT/IL2009/00317.
Letter submitted on Jul. 17, 2009 in U.S. Appl. No. 11/852,911.
A Supplementary European Search Report dated Apr. 13, 2011, which issued during the prosecution of European Patent Application No. 07827384.
An Office Action dated Apr. 19, 2011, which issued during the prosecution of U.S. Appl. No. 12/469,309.
An Office Action dated May 3, 2011, which issued during the prosecution of U.S. Appl. No. 12/471,798.
An English Translation of an Office Action dated Jun. 23, 2011 which issued during the prosecution of Chinese Patent Application No. 200880101405.7.
European Search Report dated Aug. 18, 2011, which issued during the prosecution of European Patent Application No. 0 773 6287.
A Notice of Allowance dated Sep. 9, 2011, which issued during the prosecution of U.S. Appl. No. 12/469,309.
An Office Action dated Sep. 9, 2011, which issued during the prosecution of U.S. Appl. No. 12/471,798.
An Office Action dated Nov. 7, 2011, which issued during the prosecution of U.S. Appl. No. 12/598,979.
An English Translation of an Office Action dated Feb. 7, 2012 which issued during the prosecution of Japanese Patent Application No. JP2009-508663.
A Notice of Allowance dated Feb. 15, 2012, which issued during the prosecution of U.S. Appl. No. 12/471,798.
An Office Action dated Mar. 9, 2012, which issued during the prosecution of U.S. Appl. No. 12/743,209.
An Office Action dated Mar. 20, 2012, which issued during the prosecution of U.S. Appl. No. 13/321,477.
An Office Action dated Apr. 25, 2012, which issued during the prosecution of U.S. Appl. No. 12/598,979.
An English Translation of an Office Action dated Apr. 28, 2012 which issued during the prosecution of Chinese Patent Application No. 200880101405.7.
A Supplementary European Search Report dated Jul. 5, 2012, which issued during the prosecution of European Patent Application No. 08789727.
A Supplementary European Search Report dated Aug. 23, 2012, which issued during the prosecution of European Patent Application No. 08849330.9.
An Office Action dated Oct. 12, 2012, which issued during the prosecution of U.S. Appl. No. 12/669,175.
An English Translation of an Office Action dated Oct. 25, 2012 which issued during the prosecution of Israeli Patent Application No. 201958.
An Office Action dated Nov. 7, 2012, which issued during the prosecution of U.S. Appl. No. 12/743,209.
An Office Action dated Dec. 19, 2012 which issued during the prosecution of U.S. Appl. No. 12/742,650.
An English Translation of an Office Action dated Jan. 15, 2013 which issued during the prosecution of Japanese Patent Application No. JP2010-507054.
An Office Action dated Jan. 16, 2013, which issued during the prosecution of U.S. Appl. No. 12/598,979.
An English Translation of an Office Action dated Jan. 25, 2013 which issued during the prosecution of Chinese Patent Application No. 200880101405.7.
An Office Action dated Feb. 5, 2013, which issued during the prosecution of U.S. Appl. No. 12/669,175.
An Extended European Search Report dated Feb. 11, 2013. which issued during the prosecution of European Patent Application No. 08848845.
An Extended European Search Report dated Feb. 18, 2013, which issued during the prosecution of European Application No. 09762166.
An Office Action dated Mar. 15, 2013, which issued during the prosecution of U.S. Appl. No. 13/321,467.
A Notice of Allowance dated Apr. 2, 2013, which issued during the prosecution of U.S. Appl. No. 12/743,209.
A Notice of Allowance dated Apr. 26, 2013, which issued during the prosecution of U.S. Appl. No. 12/598,979.
An Office Action dated May 9, 2013, which issued during the prosecution of U.S. Appl. No. 12/937,618.
A Notice of Allowance dated May 1, 2013, which issued during the prosecution of U.S. Appl. No. 12/742,650.
An English translation of an Office Action dated Jun. 25, 2013 which issued during the prosecution of Japanese Patent Application No. 2012-511406.
A Notice of Allowance dated Jul. 11, 2013, which issued during the prosecution of U.S. Appl. No. 13/321,477.

(56) References Cited

OTHER PUBLICATIONS

An Office Action dated Jul. 12, 2013, which issued during the prosecution of European Patent Application No. 07736287.9.
An Office Action dated Aug. 5, 2013, which issued during the prosecution of U.S. Appl. No. 12/669,175.
An English translation of an Office Action dated Aug. 27, 2013 which issued during the prosecution of Japanese Patent Application No. 2010-507054.
An Office Action dated Sep. 10, 2013, which issued during the prosecution of U.S. Appl. No. 13/657,185.
An Office Action dated Oct. 28, 2013, which issued during the prosecution of U.S. Appl. No. 14/017,545.
An Office Action dated Nov. 4, 2013, which issued during the prosecution of U.S. Appl. No. 13/323,906.
An Office Action dated Nov. 19, 2013, which issued during the prosecution of European Application No. 07827384.4.
An English Translation of an Office Action dated Jan. 6, 2014 which issued during the prosecution of Chinese Patent Application No. 201080030956.6.
An Office Action dated Jan. 10, 2014, which issued during the prosecution of European Patent Application No. 08848845.
An Office Action dated Mar. 7, 2014, which issued during the prosecution of U.S. Appl. No. 12/669,175.
Notice of Allowance dated Apr. 14, 2014, which issued during the prosecution of U.S. Appl. No. 13/657,185.
An English Translation of an Office Action dated Apr. 22, 2014 which issued during the prosecution of Israeli Patent Application No. 205687.
A Notice of Allowance dated Apr. 23, 2014, which issued during the prosecution of U.S. Appl. No. 3/323,906.
A Notice of Allowance dated Apr. 25, 2014, which issued during the prosecution of U.S. Appl. No. 13/490,705.
An Office Action dated Jun. 5, 2014, which issued during the prosecution of U.S. Appl. No. 14/017,545.
An English Translation of an Office Action dated Jun. 13, 2014 which issued during the prosecution of Chinese Patent Application No. 200880101405.7.
A Notice of Allowance dated Jun. 27, 2014, which issued during the prosecution of U.S. Appl. No. 14/017,545.
An Office Action dated Jul. 1, 2014, which issued during the prosecution of U.S. Appl. No. 13/576,330.
A Notice of Allowance dated Aug. 4, 2014, which issued during the prosecution of U.S. Appl. No. 12/669,175.
An English translation of an Office Action dated Aug. 26, 2014 which issued during the prosecution of Japanese Patent Application No. 2012-511407.
An Office Action dated Sep. 18, 2014, which issued during the prosecution of U.S. Appl. No. 14/143,827.
An Office Action dated Sep. 25, 2014, which issued during the prosecution of U.S. Appl. No. 14/461,778.
A Notice of Allowance dated Oct. 15, 2014, which issued during the prosecution of U.S. Appl. No. 14/017,545.
An English Translation of an Office Action dated Oct. 27, 2014 which issued during the prosecution of Israeli Patent Application No. 209901.
An English Translation of an Office Action dated Nov. 4, 2014 which issued during the prosecution of Chinese Patent Application No. 201080030956.6.
A Notice of Allowance dated Nov. 7, 2014, which issued during the prosecution of U.S. Appl. No. 13/490,705.
A Notice of Allowance dated Nov. 18, 2014, which issued during the prosecution of U.S. Appl. No. 13/323,906.
An Office Action dated Jan. 21, 2015, which issued during the prosecution of U.S. Appl. No. 14/461,778.
An Office Action dated Feb. 11, 2015, which issued during the prosecution of U.S. Appl. No. 13/958,893.
An Office Action dated Mar. 6, 2015, which issued during the prosecution of U.S. Appl. No. 14/055,422.

An English Translation of an Office Action dated Apr. 19, 2015 which issued during the prosecution of Israeli Patent Application No. 216396.
An English Translation of an Office Action dated Apr. 20, 2015 which issued during the prosecution of Israeli Patent Application No. 216397.
Notice of Allowance dated May 13, 2015, which issued during the prosecution of U.S. Appl. No. 14/461,778.
An English Translation of an Office Action dated May 22, 2015 which issued during the prosecution of Chinese Patent Application No. 200980160387.4.
Notice of Allowance dated May 29, 2015, which issued during the prosecution of U.S. Appl. No. 13/958,893.
An English translation of an Office Action dated Jul. 28, 2015 which issued during the prosecution of Japanese Patent Application No. 2014-125707.
An Office Action dated Jul. 28, 2015 which issued during the prosecution of U.S. Appl. No. 14/595,412.
An Office Action dated Aug. 14, 2015, which issued during the prosecution of U.S. Appl. No. 14/055,422.
An English translation of an Office Action dated Aug. 27, 2015 which issued during the prosecution of Japanese Patent Application No. 2014-218223.
European Search Report dated Sep. 16, 2015, which issued during the prosecution of European Patent Application No. 09844849.
A Supplementary European Search Report dated Sep. 23, 2015, which issued during the prosecution of European Patent Application No. 10777451.5.
An Office Action dated Dec. 4, 2015, which issued during the prosecution of U.S. Appl. No. 14/823,758.
A Notice of Allowance dated Dec. 8, 2015, which issued during the prosecution of U.S. Appl. No. 14/055,422.
An Office Action dated Jan. 26, 2016, which issued during the prosecution of Canadian Patent Application No. 2762891.
An Office Action dated Jan. 29, 2016, which issued during the prosecution of U.S. Appl. No. 14/595,954.
An Office Action dated Jan. 29, 2016, which issued during the prosecution of U.S. Appl. No. 14/528,186.
A Notice of Allowance dated Feb. 2, 2016 which issued during the prosecution of U.S. Appl. No. 14/595,412.
Notice of Allowance dated Feb. 4, 2016, which issued during the prosecution of U.S. Appl. No. 14/595,395.
A Notice of Allowance dated Mar. 3, 2016 which issued during the prosecution of U.S. Appl. No. 14/528,186.
An English translation of an Office Action dated Mar. 15, 2016, which issued during the prosecution of Japanese Patent Application No. 2014-218223.
A Notice of Allowance dated Mar. 16, 2016, which issued during the prosecution of U.S. Appl. No. 14/595,954.
A Notice of Allowance dated Mar. 23, 2016, which issued during the prosecution of U.S. Appl. No. 14/823,758.
An English translation of an Office Action dated Jun. 14, 2016 which issued during the prosecution of Japanese Patent Application No. 2014-125707.
An Office Action dated Jun. 27, 2016, which issued during the prosecution of U.S. Appl. No. 14/823,702.
An Office Action dated Sep. 27, 2016, which issued during the prosecution of U.S. Appl. No. 15/189,127.
An Office Action dated Oct. 11, 2016, which issued during the prosecution of U.S. Appl. No. 15/184,483.
A Notice of Allowance dated Oct. 11, 2016 which issued during the prosecution of U.S. Appl. No. 14/823,702.
A Notice of Allowance dated Oct. 26, 2016, which issued during the prosecution of U.S. Appl. No. 15/189,127.
A Notice of Allowance dated Dec. 14, 2016, which issued during the prosecution of U.S. Appl. No. 15/189,127.
An Office Action dated Jun. 28, 2017, which issued during the prosecution of U.S. Appl. No. 15/495,022.
Notice of Allowance dated Jan. 4, 2018, which issued during the prosecution of U.S. Appl. No. 15/495,022.
U.S. Appl. No. 60/746,646, filed May 7, 2006.

(56) References Cited

OTHER PUBLICATIONS

An International Preliminary Report on Patentability dated May 18, 2010, which issued during the prosecution of Applicant's PCT/IL2008/001495.
An International Preliminary Report on Patentability dated May 18, 2010, which issued during the prosecution of Applicant's PCT/IL2008/001494.
U.S. Appl. No. 62/163,193, filed May 18, 2015.
U.S. Appl. No. 60/804,072, filed Jun. 6, 2006.
U.S. Appl. No. 61/131,644, filed Jun. 10, 2008.
U.S. Appl. No. 62/189,367, filed Jul. 7, 2015.
U.S. Appl. No. 60/959,120, filed Jul. 10, 2007.
An International Preliminary Examination Report dated Oct. 19, 2010, which issued during the prosecution of Applicant's PCT/IL2009/00317.
An English translation of an Office Action dated Sep. 10, 2013 which issued during the prosecution of Japanese Patent Application No. 2011-513110.
An Office Action dated Sep. 12, 2018, which issued during the prosecution of U.S. Appl. No. 15/978,759.
U.S. Appl. No. 16/293,117, filed Oct. 29, 2019.

\* cited by examiner

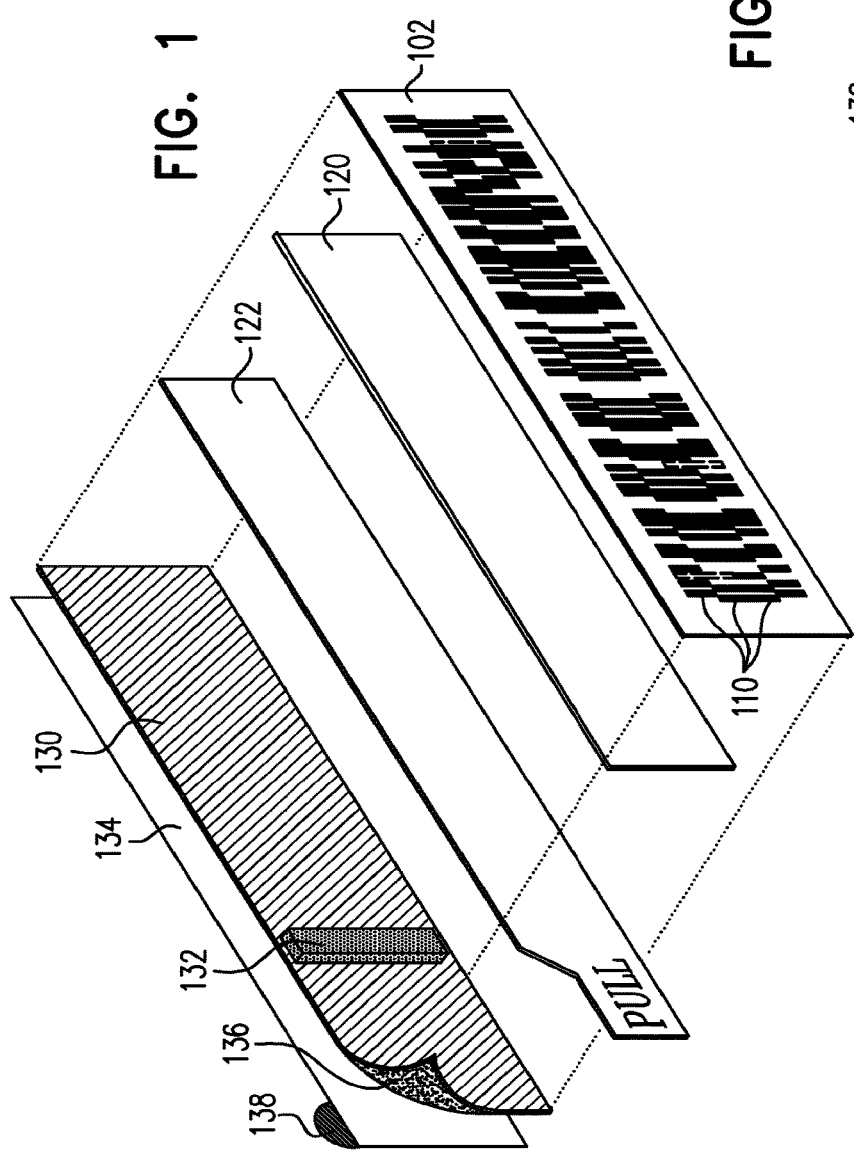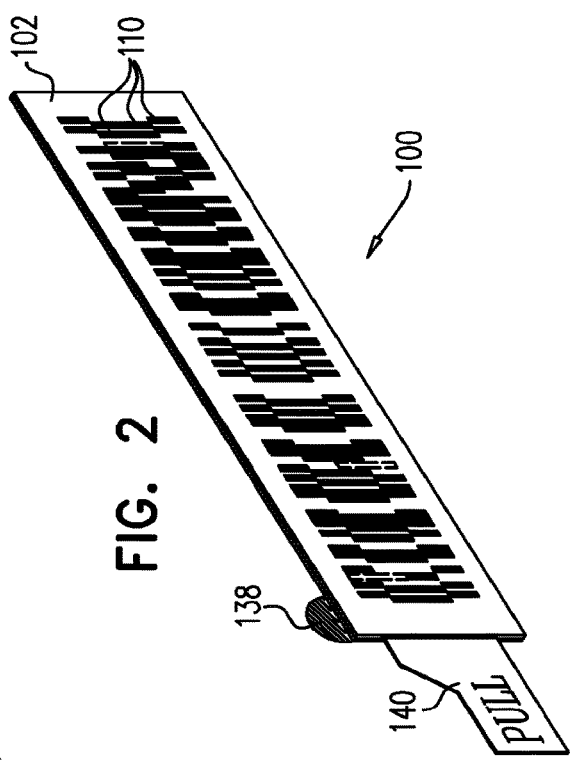

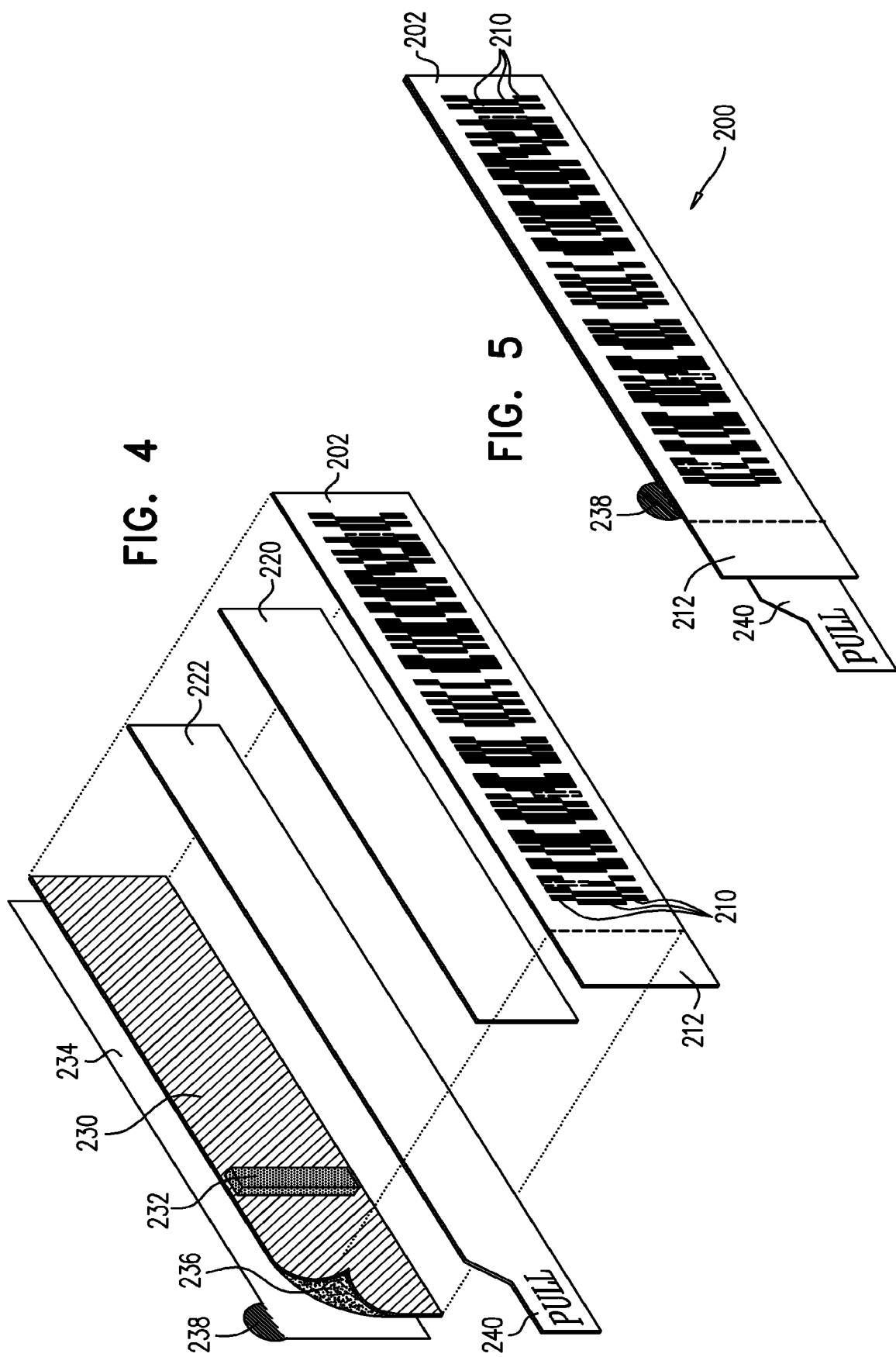

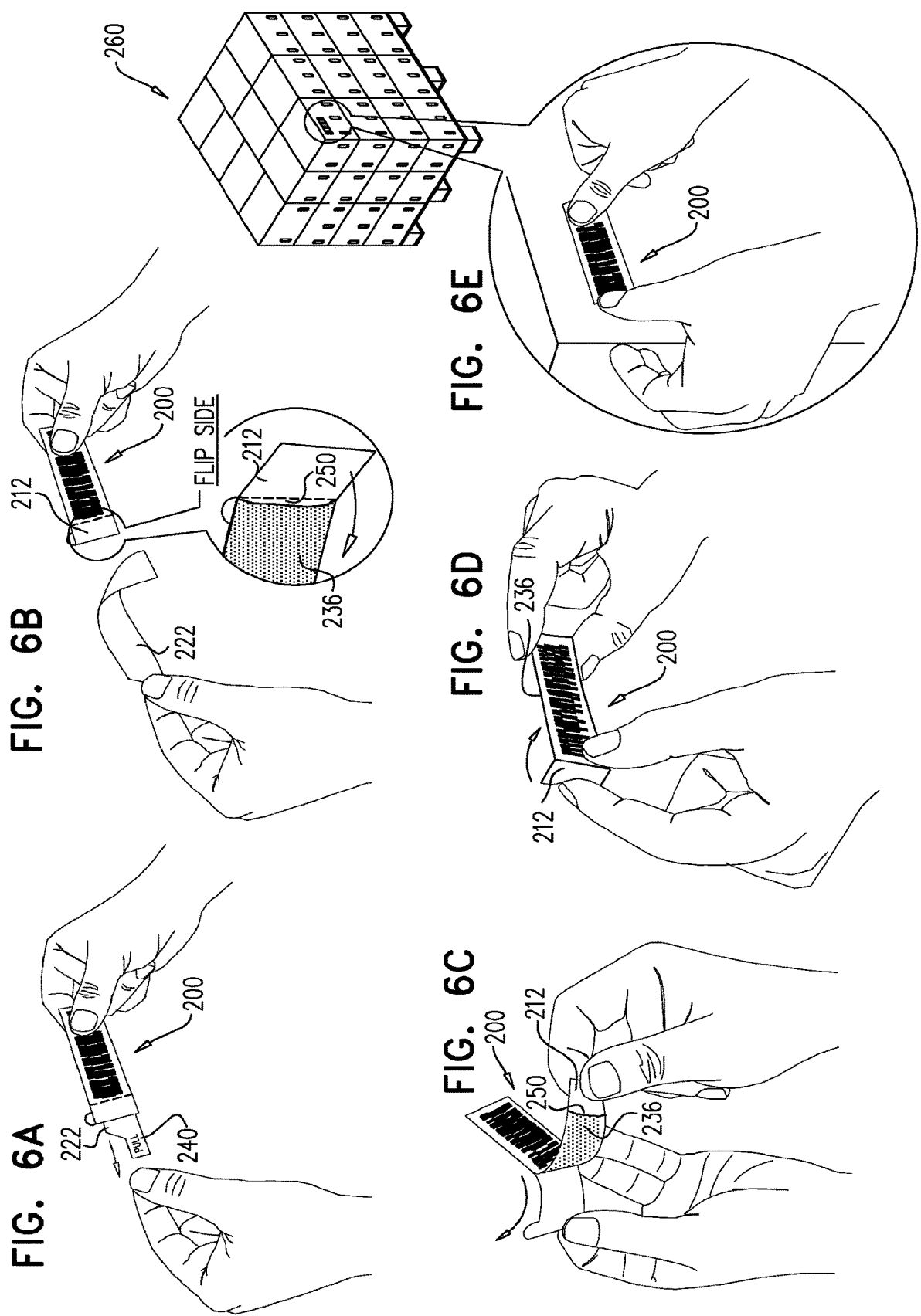

US 10,839,276 B2

TAMPER-PROOF QUALITY MANAGEMENT BARCODE INDICATORS

The present application is a continuation application of U.S. patent application Ser. No. 16/293,117, filed Mar. 5, 2019, entitled "Tamper-Proof Quality Management Barcode Indicators", which is a continuation application of U.S. patent application Ser. No. 15/944,122, filed Apr. 3, 2018, entitled "Tamper-Proof Quality Management Barcode Indicators", now U.S. Pat. No. 10,242,302, which is a continuation application of U.S. patent application Ser. No. 15/495,022, filed Apr. 24, 2017, entitled "Tamper-Proof Quality Management Barcode Indicators", now U.S. Pat. No. 9,965,712, which is a continuation application of U.S. patent application Ser. No. 15/189,127, filed Jun. 22, 2016, entitled "Tamper-Proof Quality Management Barcode Indicators", now U.S. Pat. No. 9,633,296, which is a continuation application of U.S. patent application Ser. No. 14/823,758, filed Aug. 11, 2015, entitled "Tamper-Proof Quality Management Barcode Indicators", now U.S. Pat. No. 9,400,952, which is a continuation application of U.S. patent application Ser. No. 14/461,778, filed Aug. 18, 2014, entitled "Tamper-Proof Quality Management Barcode Indicators", now U.S. Pat. No. 9,122,963, which is a continuation application of U.S. patent application Ser. No. 13/657,185, filed Oct. 22, 2012, entitled "Tamper-Proof Quality Management Barcode Indicators", now U.S. Pat. No. 8,807,422.

REFERENCE TO RELATED APPLICATIONS

Reference is made to the following patent and patent application, owned by assignee, the disclosures of which are hereby incorporated by reference:

U.S. Pat. Nos. 7,562,811 and 8,091,776; and

U.S. Published Patent Application Nos.: 2009/0230182; 2010/0219235; 2011/0006109 and 2011/0006115; and U.S. patent application Ser. Nos. 13/321,467; 13/321,477 and 13/323,906.

FIELD OF THE INVENTION

The present invention relates to tamper-proof quality management barcode indicators.

BACKGROUND OF THE INVENTION

The following publications are believed to represent the current state of the art:

U.S. Pat. Nos. 5,805,245; 6,009,400; 6,685,094; 6,758,397; 7,562,811; 8,091,776 and RE 39,266; and U.S. Published Patent Application Nos.: 2009/0230182, 2010/0219235, 2011/0006109 and 2011/0006115.

SUMMARY OF THE INVENTION

The present invention seeks to provide tamper-proof quality management barcode indicators.

There is thus provided in accordance with a preferred embodiment of the present invention a tamper-proof barcoded quality indicator operative to provide a machine-readable indication of exceedance of at least one time and temperature threshold following actuation thereof, the indicator including a first barcode including at least one first colorable area, the first barcode being machine-readable before exceedance of the at least one time and temperature threshold, at least a second barcode including at least one second colorable area, the second barcode not being machine-readable before exceedance of the at least one time and temperature threshold, a coloring agent located at a first location on the indicator, a coloring agent pathway operative, following actuation of said quality indicator, to allow the coloring agent to move, at a rate which is at least partially a function of time, from the first location to the first and second colorable areas simultaneously for simultaneous coloring thereof upon exceedance of the time and temperature threshold, thereby causing the first barcode to become unreadable and at the same time causing the second barcode to become machine-readable, and a tamper-proof actuator element operative to actuate the quality indicator upon removal thereof from said quality indicator.

Preferably, the tamper-proof actuator element is disposed between the coloring agent and the coloring agent pathway prior to actuation of the quality indicator, thereby preventing passage of the coloring agent to the coloring agent pathway. Preferably, the tamper-proof actuator element is formed of a thin flexible material. Preferably, the tamper-proof actuator element includes a pullable actuator tab which protrudes from the quality indicator prior to actuation of the tamper-proof barcoded quality indicator. Preferably, the actuation of the quality indicator includes irreversibly removing the tamper-proof actuator element from the quality indicator, thereby irreversibly enabling passage of the coloring agent to the coloring agent pathway.

Preferably, the quality indicator also includes a release layer which is adhered to an adhesive back surface of the quality indicator. Preferably, removal of the release layer is operative to expose the adhesive back surface which is operable for adhering the quality indicator to a product for which quality is to be monitored. Preferably, the release layer includes a release tab operable for enabling release of the release layer from the adhesive back surface.

There is also provided in accordance with another preferred embodiment of the present invention a barcoded quality indicator operative to provide a machine-readable indication of exceedance of at least one time and temperature threshold following actuation thereof, the indicator including a first barcode including at least one first colorable area, the first barcode being machine-readable before exceedance of the at least one time and temperature threshold, at least a second barcode including at least one second colorable area, the second barcode not being machine-readable before exceedance of the at least one time and temperature threshold, a coloring agent located at a first location on the indicator, a coloring agent pathway operative, following actuation of said quality indicator, to allow the coloring agent to move, at a rate which is at least partially a function of time, from the first location to the first and second colorable areas simultaneously for simultaneous coloring thereof upon exceedance of the time and temperature threshold, thereby causing the first barcode to become unreadable and at the same time causing the second barcode to become machine-readable, an actuator element operative to actuate the quality indicator upon removal thereof from said quality indicator, and a sealing element operative to seal the coloring agent pathway subsequent to removal of the actuator element.

Preferably, the actuator element is disposed between the coloring agent and the coloring agent pathway prior to actuation of the quality indicator, thereby preventing passage of the coloring agent to the coloring agent pathway. Preferably, the actuator element includes a pullable actuator tab which protrudes from the quality indicator prior to actuation of the barcoded quality indicator. Preferably, the actuation of the quality indicator includes irreversibly removing the actuator element from the quality indicator, thereby irreversibly enabling passage of the coloring agent to the coloring agent pathway.

Preferably, the quality indicator also includes a release layer which is adhered to an adhesive back surface of the quality indicator. Preferably, removal of the release layer is operative to expose the adhesive back surface which is operable for adhering the quality indicator to a product for which quality is to be monitored. Preferably, the release layer includes a release tab operable for enabling release of the release layer from the adhesive back surface.

Preferably, the sealing element includes a sealing tab operable for foldable sealing of the coloring agent pathway. Preferably, the sealing tab is operable for selectable adherence to the adhesive back surface, thereby sealing the coloring agent pathway.

BRIEF DESCRIPTION OF THE DRAWINGS

The present invention will be understood more fully from the following detailed description, taken in conjunction with the drawings in which:

FIG. 1 is a simplified illustration of the structure of a tamper-proof barcoded quality indicator, constructed and operative in accordance with a preferred embodiment of the present invention;

FIG. 2 is a simplified illustration of the assembled tamper-proof barcoded quality indicator of FIG. 1;

FIG. 4 is a simplified illustration of the structure of a barcoded quality indicator, constructed and operative in accordance with another preferred embodiment of the present invention;

FIG. 5 is a simplified illustration of the assembled barcoded quality indicator of FIG. 4; and FIGS. 6A, 6B, 6C, 6D and 6E are simplified pictorial illustrations of steps in the actuation of the barcoded quality indicator of FIGS. 4 and 5.

DETAILED DESCRIPTION OF A PREFERRED EMBODIMENT

Figure 3A:
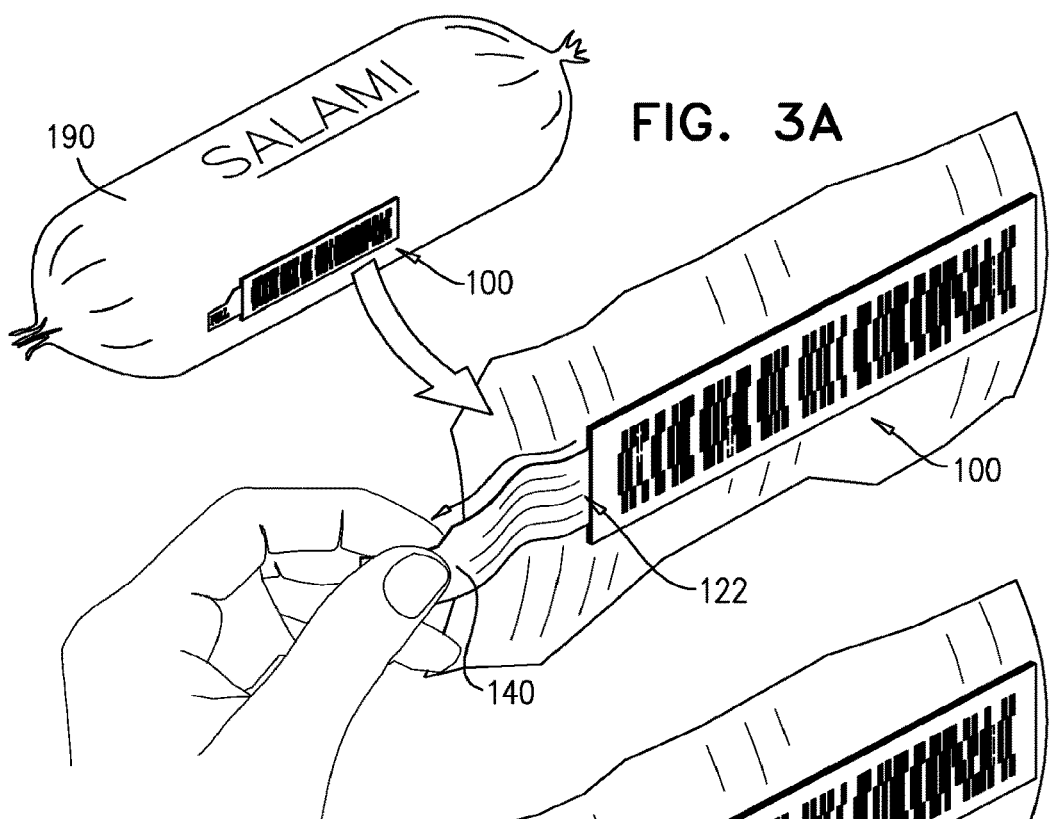
FIGS. 3A, 3B and 3C are simplified pictorial illustrations of steps in the actuation of the tamper-proof barcoded quality indicator of FIGS. 1 and 2.

Reference is now made to FIG. 1, which is a simplified illustration of the structure of a tamper-proof barcoded quality indicator, constructed and operative in accordance with a preferred embodiment of the present invention, and to FIG. 2, which is a simplified illustration of the assembled tamper-proof barcoded quality indicator of FIG. 1.

The tamper-proof barcoded quality indicator of FIGS. 1 & 2 is preferably operative to provide a machine-readable indication of exceedance of at least one time and temperature threshold following actuation thereof, and includes a first barcode including at least one first colorable area, the first barcode being machine-readable before exceedance of the at least one time and temperature threshold and at least a second barcode including at least one second colorable area, the second barcode not being machine-readable before exceedance of the at least one time and temperature threshold.

Preferably, the indicator also includes a coloring agent located at a first location on the indicator and a coloring agent pathway operative to allow the coloring agent to move, at a rate which is at least partially a function of time, from the first location to the first and second colorable areas simultaneously for simultaneous coloring thereof upon exceedance of the time and temperature threshold, thereby causing the first barcode to become unreadable and at the same time causing the second barcode to become machine-readable.

A system and method for quality management which utilizes the barcoded quality indicator of FIGS. 1 & 2 is clearly described, inter alia, in U.S. Pat. No. 8,091,776 of the applicant, which is incorporated herein by reference.

It is a particular feature of this embodiment of the present invention that the tamper-proof barcoded quality indicator of FIG. 1 also includes a tamper-proof actuator element operative to prevent passage of the coloring agent to the coloring agent pathway prior to removal thereof, and to irreversibly enable passage of the coloring agent to the coloring agent pathway following removal thereof.

As shown in FIGS. 1 & 2, tamper-proof barcoded quality indicator 100 preferably includes a barcode defining layer 102 having a multiplicity of barcodes 110 printed thereupon. Barcode defining layer 102 is preferably formed of a transparent substrate.

A coloring agent pathway 120 is preferably disposed behind barcode defining layer 102. A tamper-proof actuator pull strip 122 is preferably disposed between coloring agent pathway 120 and a back layer 130 having a coloring element 132 mounted thereupon, which coloring element 132 preferably contains coloring agents. Tamper-proof actuator pull strip 122 preferably prevents the passage therethrough of coloring agents from coloring element 132 to coloring agent pathway 120 when quality indicator 100 in a pre-actuated state.

A release layer 134 is preferably adhered to an adhesive back surface 136 of back layer 130. Removal of release layer is operative to expose adhesive back surface 136 which is operable for adhering quality indicator 100 to a product for which quality is to be monitored. Release layer 140 preferably includes a release tab 138 operable for easy release of release layer 140 from back surface 142.

FIG. 2 illustrates tamper-proof barcoded quality indicator 100 in an assembled, pre-actuated state. As shown particularly in FIG. 2, an actuator tab 140 of tamper-proof actuator pull strip 122 preferably protrudes from quality indicator 100, between coloring agent pathway 120 and back layer 130.

Figure 3B:
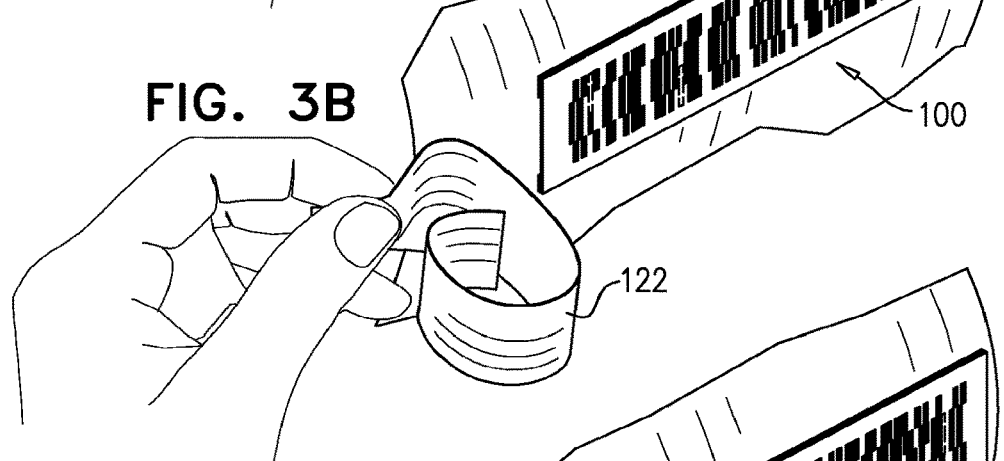
Figure 3C:
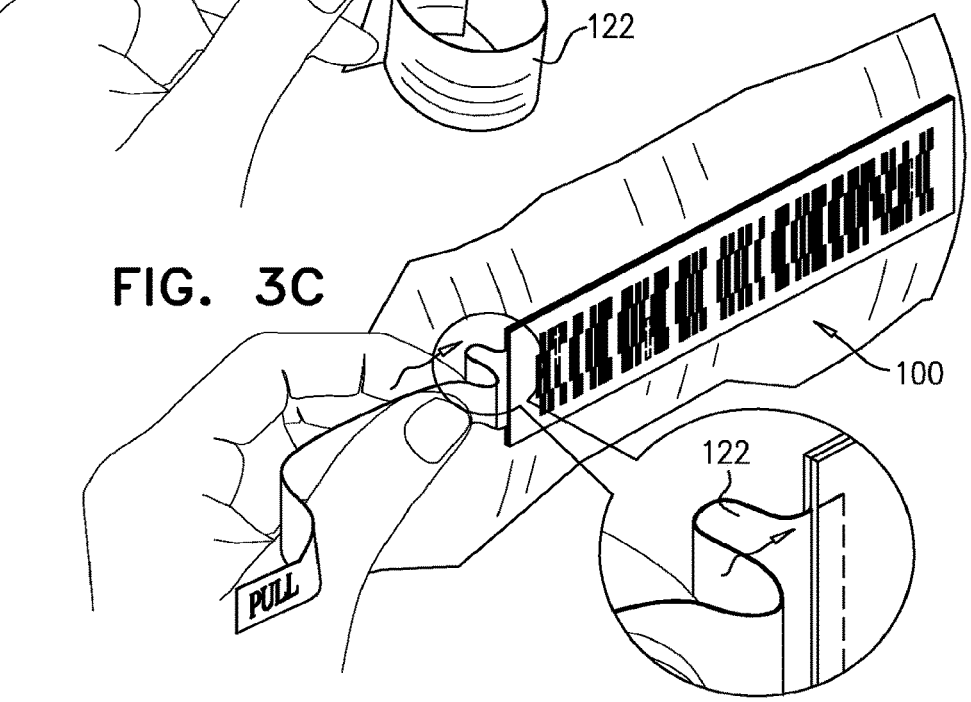

Reference is now made to FIGS. 3A, 3B and 3C, which are simplified pictorial illustrations of steps in the actuation of the tamper-proof barcoded quality indicator of FIGS. 1 & 2. As shown in FIGS. 3A-3C, after affixing tamper-proof barcoded quality indicator 100 to a product 190, indicator 100 is actuated by pulling on actuator tab 140 of tamper-proof actuator pull strip 122 and removing tamper-proof actuator pull strip 122 from between coloring agent pathway 120 and back layer 130. It is appreciated that removal of tamper-proof actuator pull strip 122 from between coloring agent pathway 120 and back layer 130 allows the passage of coloring agents contained in coloring element 132 to coloring agent pathway 120, thereby actuating proof barcoded quality indicator 100.

It is appreciated that tamper-proof actuator pull strip 122 is formed of a flexible material, such as a thin paper. Therefore, as shown in particular in FIG. 3C, it is a particular feature of this embodiment of the present invention that once removed from between coloring agent pathway 120 and back layer 130, tamper-proof actuator pull strip 122 cannot be re-inserted between coloring agent pathway 120 and back layer 130 due to the flexible nature of tamper-proof actuator pull strip 122, thereby preventing indicator 100 from returning to a pre-actuated state.

Reference is now made to FIG. 4, which is a simplified illustration of the structure of a barcoded quality indicator, constructed and operative in accordance with another preferred embodiment of the present invention, and to FIG. 5, which is a simplified illustration of the assembled barcoded quality indicator of FIG. 4.

The barcoded quality indicator of FIGS. 4 & 5 is preferably operative to provide a machine-readable indication of exceedance of at least one time and temperature threshold following actuation thereof, and includes a first barcode including at least one first colorable area, the first barcode being machine-readable before exceedance of the at least one time and temperature threshold and at least a second barcode including at least one second colorable area, the second barcode not being machine-readable before exceedance of the at least one time and temperature threshold.

Preferably, the indicator also includes a coloring agent located at a first location on the indicator and a coloring agent pathway operative to allow the coloring agent to move, at a rate which is at least partially a function of time, from the first location to the first and second colorable areas simultaneously for simultaneous coloring thereof upon exceedance of the time and temperature threshold, thereby causing the first barcode to become unreadable and at the same time causing the second barcode to become machine-readable.

A system and method for quality management which utilizes the barcoded quality indicator of FIGS. 4 & 5 is clearly described, inter alia, in U.S. Pat. No. 8,091,776 of the applicant, which is incorporated herein by reference.

Preferably, the barcoded quality indicator of FIGS. 4 and 5 also includes an actuator element operative to prevent passage of the coloring agent to the coloring agent pathway prior to removal thereof, and to irreversibly enable passage of the coloring agent to the coloring agent pathway following removal thereof.

It is a particular feature of this embodiment of the present invention that the barcoded quality indicator of FIGS. 4 and 5 also includes a sealing element operative to seal the coloring agent pathway subsequent to removal of the actuator element.

As shown in FIGS. 4 & 5, barcoded quality indicator 200 preferably includes a barcode defining layer 202 having a multiplicity of barcodes 210 printed thereupon. Barcode defining layer 202 is preferably formed of a transparent substrate, and is preferably formed with a foldable sealing tab 212.

A coloring agent pathway 220 is preferably disposed behind barcode defining layer 202. An actuator pull strip 222 is preferably disposed between coloring agent pathway 220 and a back layer 230 having a coloring element 232 mounted thereupon, which coloring element 232 preferably contains coloring agents. Actuator pull strip 222 preferably prevents the passage therethrough of coloring agents from coloring element 232 to coloring agent pathway 220 when quality indicator 200 in a pre-actuated state.

A release layer 234 is preferably adhered to an adhesive back surface 236 of back layer 230. Removal of release layer is operative to expose adhesive back surface 236 which is operable for adhering quality indicator 200 to a product for which quality is to be monitored. Release layer 234 preferably includes a release tab 238 operable for easy release of release layer 234 from back surface 236.

FIG. 5 illustrates barcoded quality indicator 200 in an assembled, pre-actuated state. As shown particularly in FIG. 5, an actuator tab 240 of actuator pull strip 222 preferably protrudes from quality indicator 200, between coloring agent pathway 220 and back layer 230.

Reference is now made to FIGS. 6A, 6B, 6C, 6D and 6E, which are simplified pictorial illustrations of steps in the actuation of the barcoded quality indicator of FIGS. 4 and 5. As shown in FIGS. 6A & 6B, indicator 200 is actuated by pulling on actuator tab 240 of actuator pull strip 222 and removing actuator pull strip 222 from between coloring agent pathway 220 and back layer 230. It is appreciated that removal of actuator pull strip 222 from between coloring agent pathway 220 and back layer 230 allows the passage of coloring agents contained in coloring element 232 to coloring agent pathway 220, thereby actuating proof barcoded quality indicator 200. It is also appreciated that removal of actuator pull strip 222 from between coloring agent pathway 220 and back layer 230 is operative to expose an open slit 250 formed between coloring agent pathway 220 and back layer 230.

Thereafter, as shown in FIG. 6C, release layer 234 is removed from adhesive back surface 236, thereby exposing adhesive back surface 236 which is operable for adhering quality indicator 200 to a pallet of produce 260 for which quality is to be monitored. Thereafter, as shown in FIG. 6D, slit 250 is sealed by folding foldable sealing tab 212 over slit 250 and adhering tab 212 to adhesive back surface 236.

It is a particular feature of this embodiment of the present invention that sealing of slit 250 by folding sealing tab 212 over slit 250 onto adhesive back surface 236 is operative to prevent environmental elements, such as moisture, from entering slit 250. It is appreciated that entry of moisture into slit 250 may damage, for example, any one of barcode defining layer 202, barcodes 210, and coloring agents contained in coloring element 232 or located in coloring agent pathway 220, thereby rendering quality indicator 200 inaccurate.

As shown in FIG. 6E, after sealing of slit 250, indicator 200 is adhered to pallet 260.

It will be appreciated by persons skilled in the art that the present invention is not limited by what has been particularly shown and described hereinabove. Rather the scope of the present invention includes both combinations and subcombinations of various features described hereinabove and variations and modifications thereof which would occur to persons skilled in the art upon reading the foregoing, which are not in the prior art.

The invention claimed is:

1. A barcoded quality indicator operative to provide a machine-readable indication of exceedance of at least one threshold following actuation thereof, said indicator comprising:

at least one barcode including at least one colorable area, said barcoded quality indicator having at least one first machine-readable state prior to exceedance of said at least one threshold and at least one second machine-readable state following exceedance of said at least one threshold;

an actuator element operative to actuate said quality indicator upon removal thereof from said quality indicator;

a release layer, adhered to an adhesive back surface of said barcoded quality indicator; and a sealing element operative to seal said barcoded quality indicator, subsequent to removal of said actuator element and said release layer, by adhering said sealing element to said adhesive back surface.

2. A barcoded quality indicator according to claim 1 and wherein said actuator element comprises a pullable actuator tab which protrudes from said quality indicator prior to actuation of said barcoded quality indicator.

3. A barcoded quality indicator according to claim 1 and wherein said actuation of said quality indicator comprises irreversibly removing said actuator element from said quality indicator.

4. A barcoded quality indicator according to claim 1 and wherein removal of said release layer is operative to expose said adhesive back surface which is operable for adhering said quality indicator to a product for which quality is to be monitored.

5. A barcoded quality indicator according to claim 1 and wherein said release layer comprises a release tab operable for enabling release of said release layer from said adhesive back surface.

* * * * *